US006560782B2

(12) United States Patent
Hourihan et al.

(10) Patent No.: US 6,560,782 B2
(45) Date of Patent: May 13, 2003

(54) ANTIMICROBIAL GLOVE AND METHOD OF MAKING SAME

(75) Inventors: Joseph Hourihan, Cedar Grove, NJ (US); Barbara Donovan, Wayne, NJ (US); Gerald Merovitz, Dover, DE (US)

(73) Assignee: Playtex Products, Inc., Westport, CT (US)

(*) Notice: Subject to any disclaimer, the term of this patent is extended or adjusted under 35 U.S.C. 154(b) by 0 days.

(21) Appl. No.: 09/878,505

(22) Filed: Jun. 11, 2001

(65) Prior Publication Data

US 2003/0005508 A1 Jan. 9, 2003

(51) Int. Cl.[7] .............................................. A41D 19/00
(52) U.S. Cl. .......................................... 2/161.7; 2/167
(58) Field of Search ...................... 2/16, 161.6, 161.7, 2/161.8, 163, 167, 168, 169; 264/305

(56) References Cited

U.S. PATENT DOCUMENTS

| | | | | |
|---|---|---|---|---|
| 3,615,745 A | * | 10/1971 | Crovetti et al. ................ | 106/15 |
| 4,499,154 A | | 2/1985 | James et al. ................. | 428/494 |
| 4,525,409 A | * | 6/1985 | Elesh .......................... | 428/193 |
| 4,675,347 A | | 6/1987 | Mochizuki et al. .......... | 523/122 |
| 4,853,978 A | | 8/1989 | Stockum .......................... | 2/167 |
| 4,935,260 A | | 6/1990 | Shlenker ........................ | 427/2 |
| 5,003,638 A | | 4/1991 | Miyake et al. .................. | 2/167 |
| 5,019,096 A | | 5/1991 | Fox, Jr. et al. ................. | 623/1 |
| 5,031,245 A | | 7/1991 | Milner .......................... | 2/168 |
| 5,089,205 A | | 2/1992 | Huang et al. ................. | 264/255 |
| 5,128,168 A | | 7/1992 | Shlenker et al. ................ | 427/2 |
| 5,133,090 A | | 7/1992 | Modak et al. .................. | 2/168 |
| 5,165,953 A | | 11/1992 | Shlenker et al. ................ | 427/2 |
| 5,180,605 A | * | 1/1993 | Milner .......................... | 427/2 |
| 5,181,276 A | | 1/1993 | Kersten et al. ............. | 2/161 R |
| 5,261,421 A | | 11/1993 | Milner ........................ | 128/898 |
| 5,338,565 A | | 8/1994 | Shlenker et al. ............ | 427/2.25 |
| 5,483,697 A | | 1/1996 | Fuchs .......................... | 2/161.7 |
| 5,487,896 A | | 1/1996 | Modak et al. ............... | 424/402 |
| 5,549,924 A | | 8/1996 | Shlenker et al. ............. | 427/2.3 |
| 5,679,399 A | | 10/1997 | Shlenker et al. ............. | 427/2.3 |
| 5,725,867 A | | 3/1998 | Mixon ........................ | 424/402 |
| 5,772,640 A | | 6/1998 | Modak et al. ............... | 604/265 |
| 5,817,365 A | | 10/1998 | Richardson et al. ........... | 427/7 |
| 5,829,442 A | | 11/1998 | Cox et al. .................... | 128/849 |
| 5,888,441 A | | 3/1999 | Milner ........................ | 264/255 |
| 5,906,823 A | | 5/1999 | Mixon ........................ | 424/402 |
| 5,965,276 A | | 10/1999 | Shlenker et al. ............ | 428/492 |
| 5,993,839 A | | 11/1999 | Mixon ........................ | 424/402 |
| 6,012,169 A | | 1/2000 | Nishi et al. .................. | 2/161.7 |

FOREIGN PATENT DOCUMENTS

| | | |
|---|---|---|
| WO | WO 94/12115 | 6/1994 |
| WO | WO 96/23428 | 8/1996 |

* cited by examiner

*Primary Examiner*—John J. Calvert
*Assistant Examiner*—Katherine Moran
(74) *Attorney, Agent, or Firm*—Ohlandt, Greeley, Ruggiero & Perlle, LLP

(57) ABSTRACT

The present invention provides a multiple, long-term use, antimicrobial glove. The glove is formed from one or more layers of material having a latex-based matrix with an antimicrobial agent, such as diiodomethyl-p-tolylsulfone, homogeneously incorporated therein. Optionally, the glove may also have additional antimicrobial agents incorporated therein. The glove of the present invention is capable of inhibiting molds and other microbes from proliferating on any surface of the glove, during both storage and use, which results in the prevention of malodor, discoloration, and degradation of the glove. Also, the glove of the present invention is believed to be capable of providing an antimicrobial effect to surfaces contacted by the antimicrobial glove.

24 Claims, No Drawings ent application of the dipping form in a coagulant solution, which causes the glove material to adhere and solidify on the form. The form is then withdrawn and the glove solidified thereon is cured, typically through a heating process. The resulting glove is subsequently stripped from the form.

ANTIMICROBIAL GLOVE AND METHOD OF MAKING SAME

BACKGROUND OF THE INVENTION

1. Field of the Invention

The present invention relates to gloves. More particularly, the present invention relates to a multiple, long-term use latex-based glove having an antimicrobial agent homogeneously incorporated therein. The present invention also relates to a method for manufacturing such a glove.

Gloves typically used in medical, food preparation, and household applications are commonly manufactured from highly elastomeric materials, such as, for example, natural rubber latex, synthetic rubber, resin, polymer, and combinations thereof. Inherent with gloves, and particularly long-term use gloves, is the problem of moisture from the user's hands and other sources, becoming trapped inside the glove. The glove is removed after use and typically stored in a dark, warm place such as a drawer, a cabinet, or a closet. The combination of moisture, organic matter, warmth, and lack of light creates an ideal environment for the growth of microbial entities. In addition, long-term use gloves are commonly used in applications where the outside of the glove comes in contact with microbial entities, which remain on the glove after use.

2. Description of the Prior Art

There exist prior art patents that are directed to antimicrobial gloves for use in the medical and food preparation fields. Representative examples of these patents, noted below, disclose a number of different techniques for imparting antimicrobial activity into gloves used for medical and food preparation applications. The typical use pattern of the gloves also dictates the form of protection required, as does the general single-use characteristic of the medical and/or food preparation gloves. These factors subsequently influence the modalities employed in the production of antimicrobial medical and food preparation gloves.

Gloves worn by medical practitioners, such as surgeons, nurses and other medical or paramedical personnel, are typically manufactured from extremely thin elastomeric materials such as natural or synthetic rubbers. Medical gloves are typically used only once; therefore long-term storage is not an issue. The objective of many of the antimicrobial medical gloves is the immediate protection of both the patient and the user from the spread and transmission of disease.

There are a variety of methods employed to accomplish this goal. U.S. Pat. No. 5,089,205 provides an antimicrobial glove manufactured by the partial forming of a glove, the dipping of the partially formed glove into a solution containing an antimicrobial agent, and the subsequent curing of the glove.

U.S. Pat. No. 5,338,565 provides an antimicrobial glove made by forming a first layer of latex, forming a second layer by dipping the first layer into antimicrobial material, then forming a third layer of latex on top of the first two layers with subsequent curing to produce the finished multilayer glove.

In another type of antimicrobial medical glove, antimicrobial agents are coated directly on one or more surfaces of the glove itself. The antimicrobial agent is utilized either alone, or in a carrier. U.S. Pat. No. 5,089,205 provides for the coating of either a cured or non-cured glove with an anionic surfactant-neutralized, cationic antimicrobial agent prior to the stripping of the final glove.

U.S. Pat. No. 5,031,245 provides the incorporation of a non-ionic antimicrobial agent (triclosan) in a glove material prior to forming the glove. In addition, it also provides a powder having another antimicrobial agent dusted on the inner surface of the glove.

Another form of incorporating antimicrobial agents within single-use medical or food preparation gloves is to form the gloves from a material containing an antimicrobial agent, in which the agent migrates from in the structure of the glove to the glove's outer surface. U.S. Pat. No. 5,725,867 provides the homogeneous incorporation of a cationic antimicrobial agent within a synthetic polymer from which a glove is formed. The polymer is a plastisol composition that allows the outward migration of the antimicrobial agent to replenish the outer surface of the glove during use.

While U.S. Pat. No. 5,725,867 provides for migration of the antimicrobial agent to the surface of the glove, other prior art references disclose the permanent incorporation of a particular antimicrobial agent in the structure of the medical or food preparation glove. For example, U.S. Pat. No. 5,180,605 provides a glove formed by premixing the antimicrobial agent 2,4,4'-trichloro-2'hydroxydiphenyl ether (triclosan) into a natural rubber latex. Subsequently, a medical use glove is formed from the mixture. The incorporation of a sparingly water-soluble, non-ionic antimicrobial agent into a single-use medical glove is said to provide antimicrobial protection for only 6 to 8 hours to the wearer of the glove.

Therefore, what is clearly needed, and not contemplated by the prior art, is a multiple, long-term use latex-based glove having an antimicrobial agent homogeneously incorporated in the material of the glove. The antimicrobial agent is present in the glove in an effective amount as to significantly, or all together, inhibit the growth of microbial entities and/or fungi on all surfaces of the glove. In addition, it is believed that the antimicrobial agent is present in an amount that also provides an antimicrobial effect on the surfaces contacted by the glove.

SUMMARY OF THE INVENTION

It is an object of the present invention to provide a multiple, long-term use glove having an antimicrobial agent.

It is another object of the present invention to provide such a multiple, long-term use glove in which the antimicrobial agent is homogeneously incorporated in the glove material.

It is still another object of the present invention to provide such a multiple, long-term use glove in which the glove is formed from latex-based material.

It is a further object of the present invention to provide a multiple, long-term use glove in which the glove is formed with one or more layers of glove material.

It is yet a further object of the present invention to provide a method for easily and economically manufacturing such a multiple, long-term use glove.

These and other object of the present invention are achieved by a multiple, long-term use, antimicrobial glove. The glove is preferably formed from one or more layers, and more preferably at least two layers, of material, with each layer comprising a latex-based matrix with an antimicrobial agent, such as diiodomethyl-p-tolylsulfone, homogeneously incorporated therein. Optionally, the glove material may also have additional antimicrobial agents incorporated therein. The glove of the present invention is capable of inhibiting molds and other microbes from proliferating on any surface of the glove, during both storage and use, which results in the prevention of malodor, discoloration, and degradation of the glove. Also, the glove of the present invention is believed to be capable of providing an antimicrobial effect to surfaces contacted by the antimicrobial glove.

DETAILED DESCRIPTION OF THE INVENTION

Inherent with multiple, long-term use gloves is the problem of moisture from the user's hands, and possibly from other sources depending on the use of the gloves, becoming trapped inside the gloves. The gloves are removed after use and typically stored in a dark warm place such as a drawer, a cabinet, or a closet. The combination of moisture, organic matter, warmth, and lack of light results in an ideal environment for the growth of microbial entities and fungi.

The present invention overcomes this problem by providing a glove having an effective amount of antimicrobial agent homogeneously incorporated throughout the material of the glove. The glove of the present invention is suitable for use in numerous applications, such as, medical, food preparation, household, and the like. In a preferred embodiment, the glove of the present invention is a household glove.

By household glove, it is meant a durable, long-term use glove that is appropriate for activities commonly engaged in during the overall maintenance of a residence, a business, a commercial setting, and the like. Such activities include, but are not limited to, janitorial activities including the cleaning of toilets, sinks, walls, bath tubs, and floors; and other maintenance activities including the cleaning of appliances, equipment, furniture, eating surfaces, food preparation surfaces, and dishes.

Household gloves are often worn while performing strenuous activity in which moisture from the user's hands becomes trapped inside. In addition, the use is often in an aqueous environment such that the gloves are often times wet or moist on both sides. After each use, the gloves are removed and typically stored in an unlit closet, drawer, cabinet, or garage. As stated above, the combination of moisture, organic matter, warmth, and lack of light creates an ideal environment for the growth of microbial entities and fungi.

In addition, the surfaces typically cleaned or touched by the user of household gloves are subject to microbial entities as part of their normal function. Examples include toilets, sinks, showers and dishes, just to name a few. Unlike a medical or food preparation environment, the user's hands may not be freshly cleaned and sanitized prior to donning household gloves. This allows for both sides of the gloves to be exposed to a wide variety of potentially harmful microbial organisms. These phenomena can lead to both microbial and fungal growth on and/or in the gloves themselves. This growth can result in discoloration, odors, and the degradation of the glove.

The glove of the present invention may be formed from or with a material, such as, natural rubber, natural rubber latex, neoprene, polyvinyl chloride, nitrile, synthetic polymer, synthetic resin, synthetic rubber, acrylic-based polymers, or any mixtures thereof. Typically, the material is present in an amount about 50 percent by weight (wt. %) to about 98 wt. % of the total weight of the glove.

In one embodiment of the present invention, the glove material is natural rubber latex. The natural rubber latex is about 50 wt. % to about 98 wt. % of the total weight of the glove.

In a second embodiment of the present invention, the glove material is a mixture of natural rubber latex and neoprene. The mixture of natural rubber latex and neoprene is about 50 wt. % to about 98 wt. % of the total weight of the glove. In the mixture, the ratio of latex to neoprene is about 10:90 to about 90:10.

In a third embodiment of the present invention, the glove is a multiple layer glove formed from at least two layers of material. When formed from two or more layers, each layer may be formed from the same glove material or any combination of glove materials in any amounts described above for use in the present invention.

In a preferred embodiment, the glove of the present invention is formed from at least three layers. When formed from at least three layers, at least two of the layers are formed from the same glove material. While the same glove material is preferably used in at least two layers, the amount of the glove material in each of the at least two layers may vary.

Antimicrobial agents suitable for use in the glove of the present invention include, for example, one or more diiodomethyl-p-tolylsulfone, 2,4,4'-trichloro-2'hydroxydiphenyl ethers (triclosan), fluorescent materials, silver salts, biguanides, chlorohexidene salts, dextran sulfates, quaternary ammonium salts, benzalkoniums, acriflavines, acridine dyes, gentian violet, mercurochromes, extracts of blue green algae, or any mixtures thereof. Preferably, the antimicrobial agent in the glove material is diiodomethyl-p-tolylsulfone, sold under the tradename Ultra Fresh® by Thompson Research Associates.

The antimicrobial agent may be present from about 0.001 wt. % to 5 wt. % of the total weight of the glove. Preferably, the antimicrobial agent is present from about 0.01 wt. % to 1.0 wt. % of the total weight of the glove. More preferably, the antimicrobial agent is present from about 0.02 wt. % to 0.5 wt. % of the total weight of the glove. It is believed that a glove with an amount of antimicrobial agent up to about 5 wt. % not only has an effective antimicrobial effect on all surfaces of the glove, but also has an antimicrobial effect on surfaces contacted by the glove. Therefore, harmful microbial entities are not only prevented from being transferred from the glove to the surface contacted, microbial entities on that surface may also be reduced or eliminated.

As seen in Table 1 below, it has been found that the homogeneous addition of the antimicrobial agent diiodomethyl-p-tolylsulfone in the glove or glove material results in a glove that is effective at significantly reducing, or all together inhibiting, both microbial and fungal growth on the glove's surfaces. By inhibiting this growth, odor, discoloration, and degradation of the glove is controlled and eliminated. This allows for longer and safer use of the glove. The following data was compiled using American Association of Textile Chemists and Colorists (AATCC) Test Method 147-1998 and Test Method 30-1998.

TABLE 1

Antimicrobial and Antibacterial Effect of Glove of the Present Invention

| Sample Gloves with | | S. Aureus | | K. Pneumonia | | E. Coli | | P. Aeruginosa | | A. Niger | |
|---|---|---|---|---|---|---|---|---|---|---|---|
| Ultra Fresh TM Level of Ultra Fresh TM*** | | Growth Free Zone (MM)* | Contact Inhibition (%)** | Growth Free Zone (MM)* | Contact Inhibition (%)** | Growth Free Zone (MM)* | Contact Inhibition (%)** | Growth Free Zone (MM)* | Contact Inhibition (%)** | Growth Free Zone (MM)* | Contact Inhibition (%)** |
| 1000 ppm | hand | 6 | 100 | 7 | 100 | 7 | 100 | 1 | 100 | 0 | 100 |
|  | wrist | 6 | 100 | 4 | 100 | 6 | 100 | 1 | 100 | 0 | 100 |
| 2000 ppm | hand | 7 | 100 | 7 | 100 | 7 | 100 | 1 | 100 | 0 | 100 |
|  | wrist | 6 | 100 | 6 | 100 | 6 | 100 | 1 | 100 | 0 | 100 |
| 3000 ppm | hand | 5 | 100 | 6 | 100 | 6 | 100 | 1 | 100 | 0 | 100 |
|  | wrist | 5 | 100 | 5 | 100 | 6 | 100 | 1 | 100 | 0 | 100 |

*The width of a growth free-zone surrounding the test specimen
**Percentage of bacteria-free area under the test specimen
***Ppm of solid active based on the weight of the glove polymer solids
S. Aureus (ATCC # 6538)
K. Pneumonia (ATCC # 4352)
E. Coli (ATCC # 8739)
P. Aeruginosa (ATCC # 13388)
A. Niger (ATCC # 6275)

The glove or glove material of the present invention may also have one or more of the following components: surfactant, cross-linker, antidegradant such as antioxidant and antiozonant, cure activator, cure accelerator, stabilizer, or any combinations thereof.

Suitable surfactants for use in the glove or glove material include any surfactant known to those skilled in the art, such as, for example, nonionic, anionic, cationic, amphoteric, or any combinations thereof. Preferably, the surfactant is present at about 1 wt. % to about 5 wt. % of the total weight of the glove material.

Cross-linkers and/or cure activators may also be included in the glove material. Suitable cross-linkers and/or cure activators include, for example, sulfur compounds, metal oxide compounds, and any combinations thereof. Preferably, the cross-linker is present at about 0.1 wt. % to about 2.5 wt. % of the total weight of the glove material. The cure activator is preferably present at about 0.1 wt. % to about 10 wt. % of the total weight of the glove material.

Antidegradants may be used in the glove to preserve the physical integrity of the glove. Suitable antidegradants may be, for example, one or more antioxidants, antiozonants, or combinations thereof. The antidegradant is preferably present at about 0.1 wt. % to about 5 wt. % of the total weight of the glove material.

Suitable cure accelerators for use in the glove material of the present invention may be, for example, one or more dithiocarbamates, thiurams, thioreas, or any combinations thereof. Preferably, the cure accelerator is present at about 0.1 wt. % to about 2.5 wt. % of the total weight of the glove material.

Suitable stabilizers that may be used in the glove compound may be, for example, one or more of: casein solutions, soap solutions, pH stabilizers, or any combinations thereof. Preferably, the stabilizer is present at about 0.1 wt. % to about 5 wt. % of the total weight of the glove material.

Optionally, the glove or glove material may also contain additional components. These additional components may be, for example, one or more pigments, extenders, or any combinations thereof. When present in the glove or glove material, the pigment is preferably in an amount about 0.1 wt. % to about 5 wt. % of the total weight of the glove material. The extender is preferably present in an amount about 0.1 wt. % to about 15 wt. % of the total weight of the glove material.

The antimicrobial glove of the present invention can be manufactured in a time and cost efficient manner, since existing manufacturing processes require little to no modification. To manufacture the preferred glove of the present invention, the antimicrobial agent, the preferred antimicrobial agent being Ultra Fresh 15®, is added as a dispersion to the glove material from which the glove is made.

The dispersion is incorporated into the glove material by simple mixing of the dispersion into a liquid latex or latex/neoprene mixture. Ultra Fresh 15® is a 15% active, water-based dispersion of diiodomethyl-p-tolylsulfone supplied by Thompson Research Associates. The latex or latex/neoprene mixture is itself an aqueous dispersion so it readily accepts and disperses the Ultra Fresh 15® evenly throughout the compound. The Ultra Fresh®-laced latex or latex/neoprene mixture is then used to manufacture gloves without any further accommodations to the standard manufacturing process.

In addition, the combination of the antimicrobial agent Ultra Fresh® with other actives can be suspended in a similar way and added to the latex or latex/neoprene matrix. Other suitable actives include, for example, triclosan, fluorescent material, silver salt, biguanide, chlorohexidene salt, dextran sulfate, quaternary ammonium salt, benzalkonium, acriflavine, acridine dye, gentian violet, mercurochrome, extract of blue green algae, or any mixtures thereof.

The foregoing is merely illustrative of the present invention and is not intended to limit the invention to the disclosed embodiment. Variations and changes, which are obvious to one skilled in the art, are intended to be within the scope and nature of the present invention, which are defined in the appended claims.

Wherefore we claim:

1. An antimicrobial glove comprising:
   a glove material; and
   an antimicrobially effective amount of diiodomethyl-p-tolylsulfone homogeneously distributed throughout said glove material.

2. The glove of claim 1, wherein said diiodomethyl-p-tolylsulfone is about 0.001 wt. % to about 5 wt. % of the total weight of the glove.

3. The glove of claim 1, wherein said diiodomethyl-p-tolylsulfone is about 0.02 wt. % to about 0.5 wt. % of the total weight of the glove.

4. The glove of claim 1, wherein said glove material is selected from the group consisting of: natural rubber, natural rubber latex, neoprene, polyvinyl chloride, nitrile, synthetic polymer, synthetic resin, synthetic rubber, acrylic-based polymer, and any mixtures thereof.

5. The glove of claim 2, wherein said glove material is selected from the group consisting of: natural rubber, natural rubber latex, neoprene, polyvinyl chloride, nitrile, synthetic polymer, synthetic resin, synthetic rubber, acrylic-based polymer, and any mixtures thereof.

6. The glove of claim 2, wherein said glove material comprises about 50 wt. % to about 98 wt. % natural rubber latex, based on the total weight of the glove.

7. The glove of claim 1, wherein said glove material comprises about 50 wt. % to about 98 wt. % natural rubber latex, based on the total weight of the glove.

8. The glove of claim 1, wherein the glove is formed from one or more layers of said glove material.

9. The glove of claim 8, wherein at least one of said one or more layers of said glove material has an antimicrobially effective amount of diiodomethyl-p-tolylsulfone homogeneously distributed throughout.

10. The glove of claim 1, wherein the glove is formed from two or more layers of said glove material.

11. The glove of claim 10, wherein at least two of said two or more layers are formed from different glove materials.

12. The glove of claim 10, wherein at least two of said two or more layers are formed from the same glove material.

13. The glove of claim 12, wherein said same glove material in each of said two or more layers is present in different amounts.

14. The glove of claim 1, wherein the glove is formed from three or more layers of said glove material.

15. The glove of claim 14, wherein at least two of said three or more layers are formed from the same glove material.

16. The glove of claim 15, wherein said same glove material in each of said at least two layers is present in different amounts.

17. The glove of claim 1, further comprising at least one additional antimicrobial agent.

18. The glove of claim 17, wherein said at least one additional antimicrobial agent is selected from the group consisting of: triclosan, fluorescent material, silver salt, biguanide, chlorohexidene salt, dextran sulfate, quaternary ammonium salt, benzalkonium, acriflavine, acridine dye, gentian violet, mercurochrome, extract of blue green algae, and any combinations thereof.

19. The glove of claim 1, wherein said glove material further comprises a component selected from the group consisting of one or more: surfactants, cross-linkers, antidegradants, cure accelerators, activators, stabilizers, pigments, extenders, and any combinations thereof.

20. A method for forming an antimicrobial glove comprising the steps of:

(a) providing an aqueous dispersion of a glove material;

(b) incorporating a second dispersion having diiodomethyl-p-tolylsulfone in said aqueous dispersion of step (a), whereby a final dispersion is formed; and (c) forming a glove from said final dispersion.

21. The method of claim 20, wherein said glove material is selected from the group consisting of: natural rubber, natural rubber latex, neoprene, polyvinyl chloride, nitrile, synthetic polymer, synthetic resin, synthetic rubber, acrylic-based polymer, and any combinations thereof.

22. The method of claim 20, further comprising a step of incorporating at least one additional dispersion in said aqueous dispersion of step (a).

23. The method of claim 22, wherein said at least one additional dispersion comprises an antimicrobial agent selected from the group consisting of: triclosan, fluorescent material, silver salt, biguanide, chlorohexidene salt, dextran sulfate, quaternary ammonium salt, benzalkonium, acriflavine, acridine dye, gentian violet, mercurochrome, extract of blue green algae, and any mixtures thereof.

24. The method of claim 20, wherein said glove material further comprises a component selected from the group consisting of one or more: surfactants, cross-linkers, antidegradants, cure accelerators, cure activators, stabilizers, pigments, extenders, and any combinations thereof.

* * * * *